United States Patent [19]

Johansson

[11] 4,063,862
[45] Dec. 20, 1977

[54] FORMING APPARATUS FOR SYNTHETIC-MATERIAL TUBES

[76] Inventor: Arne Johansson, Olsremma, S-510 95 Dalstorp, Sweden

[21] Appl. No.: 697,191

[22] Filed: June 17, 1976

[30] Foreign Application Priority Data

June 23, 1975 Germany .................. 7519907[U]

[51] Int. Cl.² ........................................... B29C 17/00
[52] U.S. Cl. ........................... 425/392; 425/403; 425/DIG. 218
[58] Field of Search ............. 425/403, DIG. 218, 441, 425/392

[56] References Cited

U.S. PATENT DOCUMENTS

| | | | |
|---|---|---|---|
| 3,677,684 | 7/1972 | Platz | 425/DIG. 218 |
| 3,811,645 | 5/1974 | Feist | 425/441 |
| 3,843,302 | 10/1974 | Petzetakis | 425/403 |
| 3,861,847 | 1/1975 | Barnett | 425/DIG. 218 |
| 3,941,539 | 3/1976 | Saumsiegle et al. | 425/441 |
| 3,966,385 | 6/1976 | Spears | 425/DIG. 218 |
| 3,989,439 | 11/1976 | Schmitzberger | 425/DIG. 218 |

Primary Examiner—Richard B. Lazarus
Attorney, Agent, or Firm—Dorfman, Herrell and Skillman

[57] ABSTRACT

A forming apparatus comprising mold parts adapted to fit inside a tube to shape a groove or other profile therein. The parts are segments of the periphery arranged in at least two groups, such that the parts of one group alternate with the parts of the other group. The first group of parts is undercut to provide pockets in which the second group may rest when the mold parts are retracted. The first group is extended first, leaving spaces therebetween which are filled by the second group when they are extended. A mechanical actuation of the parts is disclosed in one embodiment and fluid-actuation is disclosed in a second embodiment.

13 Claims, 5 Drawing Figures

FORMING APPARATUS FOR SYNTHETIC-MATERIAL TUBES

The present invention concerns a forming apparatus for synthetic-material tubes, and particularly thermoplastic tubes, (as it is described in more detail in the preamble of claim 1).

There are known synthetic-material tubes of greatly differing profiles, among others those having corrugations around them, having impressions, extrusions, or the like. It is uneconomical to provide such profiles during the production of the tubes, which are most economically made by the extrusion process, so that the profiles are provided only after the production of the tubes, which are by then also cut up into predetermined lengths.

The production of the said profiles creates great difficulties, in particular if economical production is desired, for there has to be provided not only an outer mold, but also an inner mold-core, which after the forming operation has to be removed, and for this purpose is advantageously made so that it can be taken apart or pushed together. Up to the present time such cores have had different designs proposed for them. None of these designs is, however, entirely satisfactory. Such cores are particularly unsatisfactory with regard to rapid putting into use and removal, to making the individual parts of minimum bulk, and to obtaining the various impressions or extrusions, particularly those of relatively large radial dimensions.

The present invention solves the problem of overcoming these drawbacks, by eliminating them as far as possible. The invention moreover has the objective of a general improvement and development of the level of technology.

In accordance with the invention, these problems are solved in that there is created a forming apparatus for thermoplastic tubes. Tests of such an apparatus have given very satsifactory results.

Further details and advantages of the invention are evident from the following description, with reference to the annexed drawings, in which.

The forming apparatus shown in the figures of the drawings serves to shape inner grooves in thermoplastic synthetic-material tubes. These inner grooves are produced by forcing the tube's outer wall outward so that an outer extrusion is produced at the location of the inner groove. During this operation, the tube in the region in which it is shaped, is heated in a conventional way which will not be further described.

Figure 1:
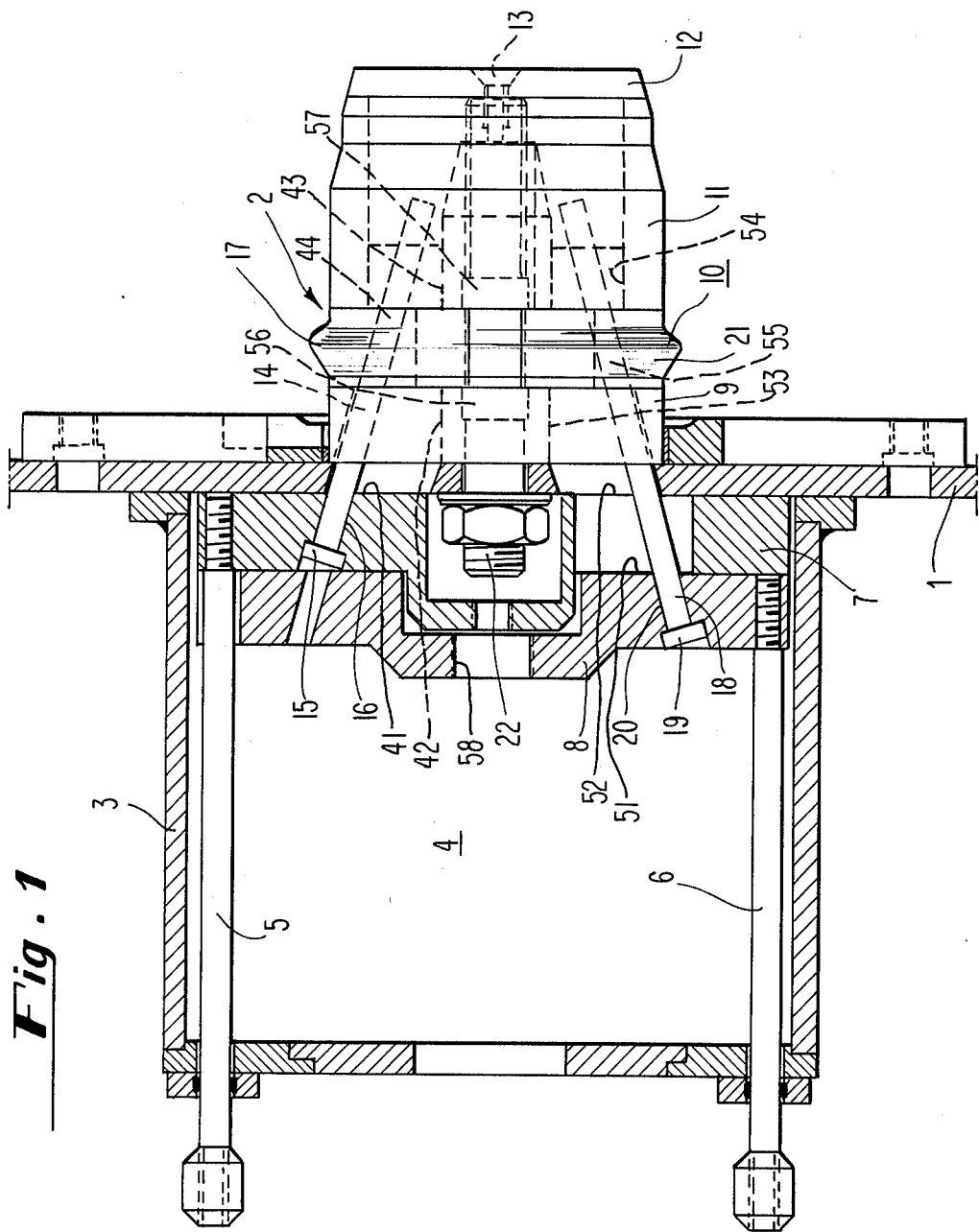
FIG. 1 is a preferred form of construction of a forming apparatus embodying an inner mold for shaping thermoplastic tubes in a diametric longitudinal section, as indicated by the line 1—1 in FIG. 2.

With the forming apparatus of FIG. 1 there is, for example, disposed on one side of a base plate 1, a mold-core designated generally 2. At the other side of the base plate a housing 3 or the like encloses a vacuum space 4 through which extend piston rods 5 and 6, which at one end are connected with parts of the mold core 2, and which at the other end extend out of housing 3 and, for example, terminate in pistons to be coupled with hydraulic cylinders (not shown). Naturally a number of such piston rods 5 and 6 may be provided. For the sake of simplicity, however, only one each of such pistons is shown. The piston 5 is connected to an inner guide plate 7, which bears against the base plate 1 at its side facing the core 2. The piston rod 6 is connected to an outer guide plate 8, which bears against the inner guide plate 7 opposite the core 2.

This core 2 advantageously has a base 9 bearing against the base plate 1, followed by a shaping part on element designated generally 10 comprising groups of mold segments or parts 17 and 21 which can be contracted and expanded, then followed by an end part 11 and finally a cover 12, which may be fastened to the end part 11, e.g. by a screw 13.

To the inner guide plate 7 is anchored the one end of an actuating rod 14, provided with a flange 15, and set in a countersunk hole 16 in the guide plate 7. The actuating rod 14 goes through the base plate 1, the base 9, the forming part 10, and extends into the end part 11 while continuously approaching the middle axis of the forming apparatus. In other words, the rod has an angular or slanting position. In the base plate 1 and the base 9, as well as in the end part 11, the rod 14 passes through elongated holes enlarged radially (radial slots 41, 42, and 43), which consequently permit generally sidewise movements of the rod in a direction parallel to the middle axis. On the other hand, the rod 14 within the shaping part 10 goes through a cylindrical bore 44m the mold part or segment 17 without clearance, which means that the part 17, during displacement of the rod 14, is displaced radially by a camming action.

In the outer guide plate 8 is installed similarly an actuating rod 18 having a flange 19 and set in a countersunk hole 20. This rod 18, for its part, passes through the parts 7, 1, 9 and 11 in elongated holes (radial slots 51, 52, 53 and 54) permitting similar displacement of the rod in a direction parallel to the middle axis while going through a cylindrical bore 55 in part or segment 21 without clearance so that these parts are displaced radially by camming action of the rod 18.

Figure 2:
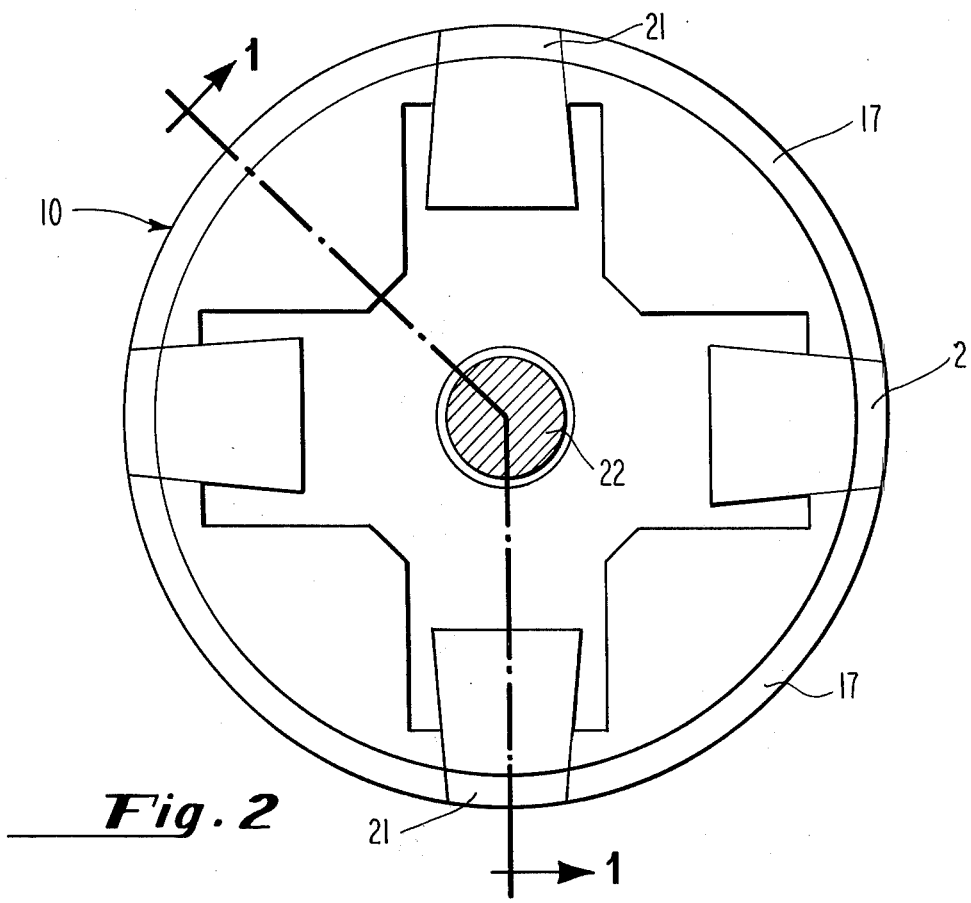
FIG. 2 is a front view of an inner mold shown in FIG. 1, with the actuating rods omitted.

The mold parts 17 are made relatively large and extend, as shown in FIG. 2, around substantially the entire periphery of the shaping part 10. On the other hand, the mold parts 21 are smaller and are of cuneiform or of rather trapezoidal form, tapered outwardly. In FIG. 2, the shaping part 10 is shown in expanded position ready to shape the thermoplastic synthetic-material tube. In the upper part FIG. 3 similar mold parts 17' and 21' are shown contracted whereby a tube can be pushed on or pulled off. The mold parts 17 and 21 alternate about the periphery so that each part of one group is disposed between two parts of the other group.

It is also seen from FIG. 1 that the parts 9 to 12 are held on an axle 22 which is anchored in the base plate 1. The shaping part 10 is held between collars, shoulders or the like on the axle as indicated at 56 and 57.

The way in which the forming apparatus of FIGS. 1 to 3 works is as follows: In the position shown in FIG. 3, a tube with a deformable end, which is, for example, heated, is pushed over the parts 9 to 12. Hereby the forming parts 17 and 21 are contracted as shown in the upper part of FIG. 3. Then, the piston rod 5 which extends out of the housing 3, is run in, i.e., in FIG. 1, toward the right into the position shown there, so that the mold parts 17 are displaced radially outward and assume the position shown in FIG. 2. Between the adjacent pieces 17 there is sufficient room available that during the following run-in of the rod 6 from an initial left-hand position (not shown) into the right-hand position shown in FIG. 1, the mold parts 21 are displaced radially outward between the parts 17 as shown in FIG. 2. Hereby the mold parts 17 and 21 press themselves into the deformable material, producing the desired groove or the like. If desired, a softened tube may be pushed over the parts 9 to 12 while the mold parts 17 and 21 are expanded. At the same time, suction or a vacuum is produced in space 4, which communicates with the interior of the tube through a central opening 58 in the plate 8, the slots 51, 52, and 53, and the clearance around the segments 17 and 21,. The vacuum sucks on the tube so that the desired profile is obtained, outer mold parts being dispensed with as far as possible. The movements of the guide plates 7 and 8 are made through the intermediary of a hollow axle or the like, whereby two axles or the like are piloted one in the other and may be operated independently of one another. The individual operations are preferably triggered by limit switches, so that, for example, at the end of a operative stroke, the limit switch actuates a part of the next operation, and so forth. In this way it is possible to operate the forming apparatus continuously. After effecting the desired extrusion or impression, and after the material has been set into the desired shape or profile, the mold part 21 is displaced radially inward and then the mold part 17 is similarly displaced.

Thanks to the fact that the mold parts are divided into two groups, a forming part belonging to the one group is disposed circumferentially between two forming parts belonging to the other group At their opposite circumferential ends, the forming segments are offset or tapered in a direction toward the center axis of the forming core, e.g. in the form of undercuts, recesses or the like, which in the pushed together state of the forming core are provided to receive the forming parts of the other group. It thus becomes practical without complicated mechanisms, to achieve a simple and reliable way of operating the forming apparatus of the invention to displace the mold segments inwardly and outwardly in a radial plane without complicated displacements of the mold segments in an axial direction.

Figure 3:
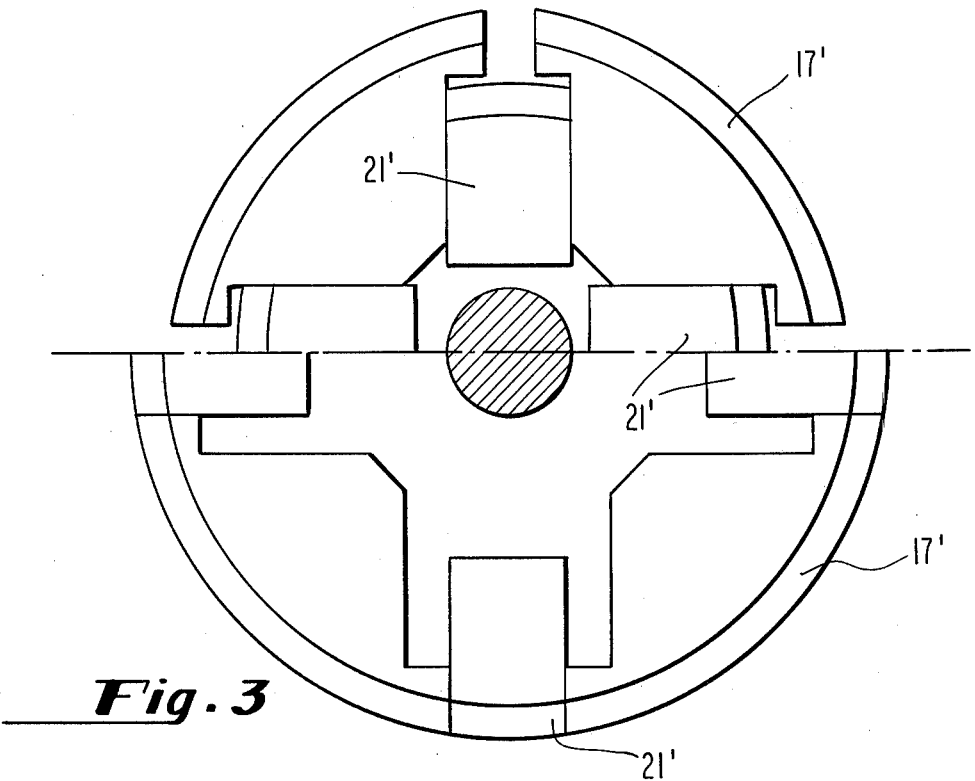
FIG. 3 is a view similar to FIG. 2 showing somewhat modified mold parts of the one group, the upper portion of the figure showing the parts contracted and the lower part of the figure showing the parts expanded.
Figure 4:
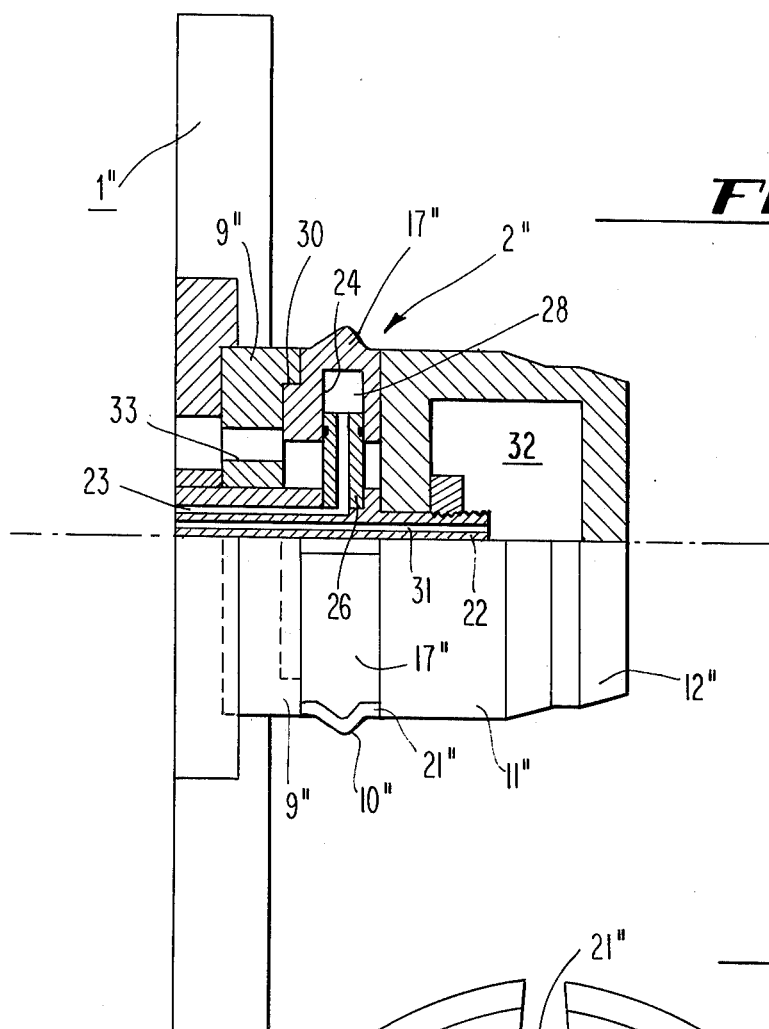
FIG. 4 is a view corresponding to FIG. 1 of a modified apparatus according to the invention.
Figure 5:
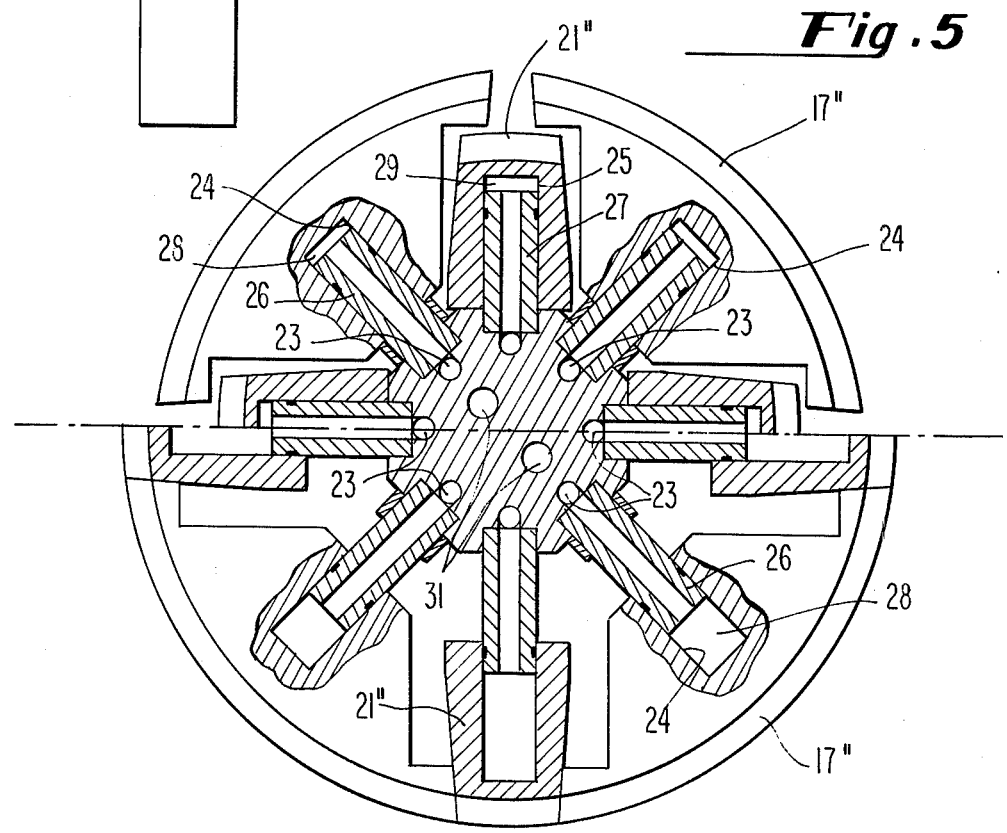
FIG. 5 is a view corresponding to FIG. 3, inner mold parts shown in FIG. 4.

Whereas the above-described form of construction, shown in FIGS. 1 to 3 of the drawings, is provided for mechanical operation, the design of FIGS. 4 and 5 is for pneumatic operation, or preferably hydraulic operation. The outer structure of the apparatus of FIGS. 4 and 5 looks like that of the apparatus of FIGS. 1 to 3. The mold parts 17" and 21" may also be identical or similar. However, in the case under consideration there are lacking the rods 14 and 18, as well as the guide plates 7 and 8 and the rods 5 and 6. These parts are replaced by a hydraulic or pneumatic system, whereby a hydraulic or pneumatic medium has access to the region inside or behind the mold parts 17" and 21",provided here, for example, with a cylindrical bore 24 or 25, into each of which engage pistons 26 or 27, through which the channels 23 have their outlet into a chamber 28 or 29 forming the innermost part of the bore 24 or 25.

The pushed-together position of the core shown in FIG. 5 has for the impression of an inner groove in a tube a hydraulic or pneumatic medium forced into the channel 23, having outlets into the chambers 28 associated with the larger forming parts 17", so that these parts become pushed radially outward (expanded) until they reach a certain limit position, determined by the stops 30 set in the base 9', as shown in FIG. 4. The stops may, if desired, be different or completely eliminated, e.g. replaced with outer mold parts. The pressure medium used also acts in the other channels 23 and in the chambers 29 so that the smaller forming parts 21" assume the operative position shown in the lower part of FIG. 5. Then the forming parts 21" are contracted again, which can be done in that the pressure medium is subjected to underpressure and/or by the aid of springs.

FIGS. 4 and 5, moreover, designate by 31 channels provided for a circulating coolant, e.g. water, which can flow into the hollow part 32 in the part 11", to cool it as well as other parts. Furthermore, if desired, passages may be provided where desired for coolant. In certain cases, heating may be provided instead of cooling. Furthermore, 33 designates a passage for transmitting underpressure outside the parts 2", 9" and 11".

Such a design with hydraulic or pneumatic operation is particularly useful for providing inner grooves in synthetic-material tubes of larger diamter.

The forms of construction described above and shown in the drawings are to be regarded only as non-limiting examples which may be modified as desired within the scope of the inventive idea and the following patent claims, or may be supplemented. There may be more than two groups which may be arranged in alternation around the periphery and operated in any desired sequence. For the sake of orderliness, it should be pointed out that the parts of FIGS. 2 and 3 are not in complete agreement, in that the smaller forming part 21 of FIG. 2 is approximately trapezoidal, whereas in FIG. 3, the part 21' has parallel side edges, as in the case with the larger forming parts 17 and 17'. Such a design is naturally possible, but it should be advantageous to make use of smaller forming parts having at least a small taper.

I claim:

1. For shaping the inner surface of tubes of deformable material, forming apparatus disposed within the tube, with its middle axis on the longitudinal axis of said tube including means to soften the tube in the region where forming is to occur, and at least one shaping element forcing radially outward a portion of the tube to produce an inner profile, which element is provided with a number of mold segments disposed end-to-end about the periphery of said element in a common plane radial to said tube axis and which are radially extendable and retractable, said segments being divided into at least two groups, a mold segment belonging to the one group being disposed between segments belonging to at least one other group, the segments of the one group at their opposite ends having offset portions toward the central axis to provide a pocket which, when the shaping element is contracted, receives the mold segment of the other group, a guide plate for each group of segments, each said guide plate being displaceable axially of said tube to effect movement of actuating rods which effects radial displacement of the segments in the group.

2. An apparatus according to claim 1 characterized in that it has a base plate disposed in a radial plane, at one side of which is mounted the shaping element and at the other side of which is mounted the guide plates, said base plate having openings through which said actuating rods pass.

3. A forming apparatus according to claim 1 wherein each of said guide plates has rod means for displacing said segments, characterized in that the rod of said one guide plate passes outwardly slidably through said other guide plate, and means for displacing the respective rod means independently of each other.

4. A forming apparatus according to claim 3 including a housing surrounding the guide plates, and means sealing said housing and permitting axial movement of the plates therein, said rod means extending through said sealing means.

5. A forming apparatus according to claim 4 characterized in that the sealed housing encloses a vacuum space, and means connecting underpressure producing means to said space, said space communicating with said segments for producing suction around said shaping element and within the deformable region of the tube.

6. A forming apparatus according to claim 1 characterized in that for each actuating rod its associated guide plate has a countersunk hole and said rod is formed with a flanged end or head to engage in said hole.

7. A forming apparatus according to claim 6 including an axle anchored in the base plate, and having collars or shoulders to hold the mold segments.

8. A forming apparatus according to claim 1 characterized in that the one group of mold parts extends considerably farther peripherally than the other.

9. A forming apparatus according to claim 1 characterized in that one group of mold parts is cuneiform or trapezoidal, for insertion between the mold parts of the other group.

10. A forming apparatus according to claim 1 wherein each of said guide plates has a hollow shaft, said shafts being formed whereby the shafts are piloted one in the other, and can be operated independently of one another.

11. For shaping the inner surface of tubes of deformable material, forming apparatus disposed within the tube with its middle axis on the longitudinal axis of said tube, including means to soften the tube in the region where forming is to occur and at least one shaping element forcing radially outward a portion of the tube to produce an inner profile, which element is provided with a core and a number of mold segments disposed end-to-end about the periphery of said element in a common plane radial to said tube axis and which are radially extendable and retractable, said segments being divided into at least two groups, the mold segments belonging to one group being disposed between segments belonging to at least one other group, the segments of one group at their oppposite ends having offset portions toward the central axis to provide a pocket which, when the shaping element is contracted, receives the mold segment of the other group, each segment having a cylindrical bore disposed radial to said axis, the core of said element having in said common radial plane a piston for each of said mold segments, the piston for one group having channels communicating with a supply of pressure medium and the piston for the other group having channels for separate communication with a source of pressure medium whereby said separate communication of pressure medium may introduce pressure medium into said cylinders of the one group independently of the cylinders of the other group and effect independent radial displacement of the respective groups of segments.

12. A forming apparatus according to claim 11 wherein said shaping element core includes a central base part within said common radial plane, said pistons being formed in said central base part and said fluid-communication means comprises passages of generally L-shaped form having legs extending radially through the centers of said pistons in said base part and legs extending axially perpendicular to said common radial plane prallel to the axis of said tube, said base part including also separate passages for heat exchange medium to control the temperature of the shaping element.

13. A forming apparatus according to claim 11 including passage means communicating with the exterior surface of said mold segments for transmitting underpressure outside of the segments interiorly of the tube.

* * * * *

UNITED STATES PATENT OFFICE
CERTIFICATE OF CORRECTION

Patent No. 4,063,862                        Dated December 20, 1977

Inventor(s) Arne Johansson

It is certified that error appears in the above-identified patent and that said Letters Patent are hereby corrected as shown below:

Column 2, line 14, "on" should be --or--;
Column 3, line 37, after "segments" --of the one group-- should be inserted;
Column 4, line 4, "9' " should be --9"--;
Column 4, line 23, "diamter" should be --diameter--;
Claim 12, line 9, "prallel" should be --parallel--.

Signed and Sealed this

Eleventh Day of April 1978

[SEAL]

Attest:

RUTH C. MASON
Attesting Officer

LUTRELLE F. PARKER
Acting Commissioner of Patents and Trademarks